United States Patent
Poulos et al.

(10) Patent No.: US 7,949,481 B2
(45) Date of Patent: May 24, 2011

(54) SELF-ORIENTING EMBEDDED IN-SITU FLUX SYSTEM

(75) Inventors: Gregory S. Poulos, Golden, CO (US); Steven R. Semmer, Westminster, CO (US); Fox Jack, Broomfield, CO (US); Militzer John, Boulder, CO (US); Gordon Maclean, Boulder, CO (US)

(73) Assignee: University Corporation for Atmospheric Research, Boulder, CO (US)

( * ) Notice: Subject to any disclaimer, the term of this patent is extended or adjusted under 35 U.S.C. 154(b) by 264 days.

(21) Appl. No.: 12/124,469

(22) Filed: May 21, 2008

(65) Prior Publication Data

US 2008/0294356 A1    Nov. 27, 2008

Related U.S. Application Data

(60) Provisional application No. 60/939,261, filed on May 21, 2007.

(51) Int. Cl.
*G01L 1/00* (2006.01)
*G01F 1/00* (2006.01)

(52) U.S. Cl. .......................... 702/41; 73/170.01; 702/45

(58) Field of Classification Search .................... 702/45, 702/94, 117, 122, 130, 138, 170, 41; 73/861.27, 73/861.95, 170.01; 374/109; 416/1; 356/128
See application file for complete search history.

(56) References Cited

U.S. PATENT DOCUMENTS 7,117,735 B2 * 10/2006 Shoemaker et al. ....... 73/170.01

OTHER PUBLICATIONS

Jorgensen, Finn E. How to measure turbulence with hot-wire anemometers—a practical guide. Dantec Dynamics. 2002.

Lekakis, I. Calibration and signal interpretation for single and multiple hot-wire/hot-film probes. Meas. Sci. Technol. vol. 7. pp. 1313-1333. 1996.

Mathioudakis, K. et al. Use of triple hot wires to measure unsteady flows with large direction changes. J. Phys. E: Sci. Instrum. vol. 18. pp. 414-419. May 1985.

Slager et al. Measuring the viscous dissipation of turbulent kinetic energy with a hotwire and a sonic anemometer. 15th Conference on Boundary Layer and Turbulence, Wageningen, The Netherlands, Poster 3.9. Jul. 2002.

* cited by examiner

*Primary Examiner* — John H Le
(74) *Attorney, Agent, or Firm* — Marsh Fischmann & Breyfogle LLP

(57) ABSTRACT

A fluid flux measurement system that includes a heated element fluid flow sensor that is capable of being repositioned relative to a mean fluid flux direction is disclosed. The repositioning may be performed by a motor interconnected to the heated element fluid flow sensor. The heated element fluid flow sensor may be positioned proximate to the measurement region of a sonic anemometer and may be operable to be repositioned relative to the sonic anemometer. The heated element fluid flow sensor may be a three-dimensional hot-film constant temperature anemometer. The fluid flux system may be operable to measure small-scale turbulent fluxes in uncontrolled environments such as remotely located atmospheric monitoring stations. The heated element fluid flow sensor may be calibrated in-situ with data collected by the sonic anemometer.

17 Claims, 7 Drawing Sheets

SELF-ORIENTING EMBEDDED IN-SITU FLUX SYSTEM

CROSS-REFERENCE TO RELATED APPLICATIONS

This application claims the benefit of U.S. Provisional Application No. 60/939,261 filed May 21, 2007, which is incorporated herein by reference in its entirety.

GOVERNMENT SUPPORT

The present invention was made with Government support under Cooperative Agreement No. ATM-0301213 awarded by the National Science Foundation. The Government has certain rights in this invention.

FIELD OF THE INVENTION

This invention relates to fluid flux measurement systems in general, and in particular to methods and devices embodying a self-orienting in-situ fluid flux measurement system, and more particularly to methods and devices embodying a self-orienting and self-calibrating in-situ fluid flux measurement system operable to function in an uncontrolled environment, such as, the surface layer of the earth's atmosphere.

BACKGROUND OF THE INVENTION

There are many devices available for fluid flow measurement. Mechanical wind vanes and half-cup or propeller anemometers are examples of well-known fluid flow sensors. More sophisticated systems are available for measuring turbulence within a fluid flux.

For example, sonic anemometers are known to have advantages over conventional mechanical anemometers. Sonic anemometers may have no moving parts, require no calibration, and may be very durable, making them particularly well suited for relatively remote or inaccessible locations. Furthermore, sonic anemometers have a faster response time and are more accurate and precise than conventional mechanical anemometers. Generally, the sonic anemometers employ a plurality of ultrasonic transducers to generate and receive ultrasonic signals. Signal propagation times along linear paths between transducers are determined and used to calculate wind speed and direction. The determination may be in three dimensions and the sonic anemometer may be operable to measure wind in any direction relative to the anemometer.

Another example of a sophisticated fluid flux sensor is a heated element fluid flow sensor. Heated element fluid flow sensors may be used to measure fluid velocity based on the amount of heat transported away by a fluid passing a heated element. The amount of heat lost is a function of the fluid velocity passing the element. In a typical heated element fluid flow sensor, a hot wire or film is, for example, heated to a constant temperature, maintained at a constant voltage, or maintained at a constant current.

SUMMARY OF THE INVENTION

The present invention relates to fluid flux sensors able to measure small scale turbulence in a fluid flux that may vary in mean flow direction over a relatively wide range of angles. This may be accomplished by mounting a heated element fluid flow sensor onto a repositionable member and automatically adjusting the pointing direction of the heated element fluid flow sensor into the mean fluid flux direction.

The present inventors have recognized that existing fluid flux systems, and in particular existing atmospheric boundary layer anemometer systems are incapable of satisfactorily remotely measuring atmospheric turbulence across a wide range of turbulent structures (e.g., from the Taylor microscale through larger scale features) and across a wide range of mean wind directions. In this regard, sonic anemometers generally do not need calibration, are robust enough to operate unattended in remote and/or difficult to access locations, and may be capable of measuring across a wide range of mean wind direction (e.g., 360 degrees). However, generally sonic anemometers average their readings over a significant distance (e.g., about 10 cm) and have a sampling frequency that is too low, rendering them unsuitable for measuring small-scale turbulence.

The present inventors have also recognized that existing heated element fluid flow sensors, such as hot-film constant temperature anemometers (CTAs), generally are capable of high frequency measurements of small scale turbulence. However, generally, hot-film CTAs require frequent calibration due to drift, have a limited angle of attack (e.g., the angle in which they are able to make reliable measurements), and are relatively fragile, making them unsuitable for remote deployment or deployment in uncontrolled conditions.

Embodiments of the present invention provide for a sensor system that possesses the small-scale turbulence measuring capabilities of a heated element fluid flow sensor, and is able to make measurements over a wide range of mean wind direction. This may be accomplished by mounting a heated element fluid flow sensor on a movable member. The movable member may be operable to rotate the heated element fluid flow sensor to keep the wind mean direction within the angle of attack of the heated element fluid flow sensor. The movable member may be interconnected to the output of a motor. The movement of the heated element fluid flow sensor may be automated.

Embodiments of the present invention may include a repositionable protective member (e.g., a protective sleeve) that may be used to protect the heated element fluid flow sensor from potentially damaging conditions (e.g., strong winds, hail). The repositionable protective member may be operable to be positioned in a first position where it does not significantly affect measurement made by the heated element fluid flow sensor and a second position where it protects the heated element fluid flow sensor.

Furthermore, the present inventors have recognized that previous attempts to combine sonic anemometers and heated element fluid flow sensors have not been fully successful in overcoming the aforementioned issues with the individual sensors (e.g., the limited angle of attack). Embodiments of the present invention provide for a heated element fluid flow sensor interconnected to a movable member, where the heated element fluid flow sensor is disposed proximate to the measurement region of a sonic anemometer. In this regard, the movable member may allow for the heated element fluid flow sensor to be positioned such that the mean wind direction is within the angle of attack of the heated element fluid flow sensor. Thus the system benefits from the fast response and small-scale measurement capabilities of the heated element fluid flow sensor over a large range of mean wind directions due to the interconnection to the movable member. The sonic anemometer may also be used to calibrate the heated element fluid flow sensor in-situ, thereby eliminating the need for frequent laboratory calibration and enabling deployment in remote and/or difficult to access locations. The sonic anemometer may also be used to measure mean wind direction. This measurement may then be used to reposition the heated element fluid flow sensor.

Embodiments of the present invention disclosed herein may be beneficial to measure momentum flux and/or small-scale turbulent fluxes in the atmospheric boundary layer. This information may be used to aid in determining a variety of atmospheric characteristics. For example, the information may be used to improve the quality of numerical weather prediction, large-eddy simulation, global climate simulation, and worst-case air pollution and toxic substance calculations.

In accordance with one aspect of the present invention, an atmospheric measurement system is provided. The atmospheric measurement system may include a sonic anemometer, a heated element anemometer, and a mount for mounting the heated element anemometer relative to the sonic anemometer, wherein a position of the heated element anemometer relative to the sonic anemometer is adjustable.

In an embodiment of the current aspect, the heated element anemometer may be a constant temperature anemometer (e.g., a hot-wire anemometer or a hot-film anemometer). In an embodiment, the heated element anemometer may be disposed proximate to a measurement path of the sonic anemometer such that the heated element anemometer and the sonic anemometer are operable to measure substantially the same fluid movement.

In an arrangement, the atmospheric measurement system may further include an electric motor. A stationary portion of the electric motor may be fixedly interconnected to the sonic anemometer and a rotational output of the electric motor may be interconnected to the heated element anemometer. The sonic anemometer may define a first axis between two transducer mounting points, and the heated element anemometer may be pivotable through an arc contained within a plane perpendicular to the first axis.

In a configuration, the atmospheric measurement system may further include a processor and a computer usable medium having computer program code embodied therein. The computer program code may include computer readable program code enabling the processor to determine a mean wind direction at least partially form data obtained from at least one of the sonic anemometer and the heated element anemometer. The computer readable program code may enable the processor to generate an output signal capable of reorienting the heated element anemometer to face into the mean wind direction.

In an arrangement, the atmospheric measurement system may be operable to adjust the position of the heated element anemometer relative to the sonic anemometer automatically in response to a measurement by the fluid flux measurement system.

In an embodiment, the atmospheric measurement system may further include a movable protective member for protecting the heated element anemometer. The movable protective member may be repositionable between a first position and a second position. In the first position, the movable protective member may be positioned such that is does not substantially interfere with the measurement capability of the heated element anemometer while in the second position the movable protective member may be operable to protect the heated element anemometer from local weather conditions. The movable protective member may be operable to be automatically moved between the first position and the second position based at least in part on measurements made by at least one of the sonic anemometer and the heated element anemometer.

In another aspect, a method of measuring atmospheric flux is provided that includes simultaneously and independently measuring atmospheric flux with a sonic anemometer and a heated element anemometer where the heated element anemometer is disposed proximate to the sonic anemometer then calibrating the heated element anemometer based on the simultaneous measurements. The method may further include measuring atmospheric flux with the heated element anemometer after calibration and then adjusting a position of the heated element anemometer relative to the sonic anemometer.

In an arrangement, the adjusting may be performed automatically in response to a change in mean wind direction proximate to the heated element anemometer. The change in mean wind direction may be measured by at least one of the sonic anemometer and the heated element anemometer. The adjusting may be a pivotal movement of the heated element anemometer relative to the sonic anemometer where the pivotal movement aligns an angle of attack of the heated element anemometer with the mean wind direction.

In an embodiment, the method may further include positioning a protective sleeve over the heated element anemometer in response to a first set of predetermined atmospheric conditions and retracting the protective sleeve from over the heated element anemometer in response to a second set of predetermined atmospheric conditions. The first set of predetermined atmospheric conditions may, for example, include a predetermined wind velocity.

In still another aspect, a fluid flux measurement system is provided that may include a heated-element fluid flow sensor and a motor. The stationary portion of the motor may be operable to be attached to a fixed member and the heated-element fluid flow sensor may be interconnected to an output of the motor. In such a configuration, the motor may be operable to cause the heated-element fluid flow sensor to move relative to the stationary portion of the motor.

An embodiment of the fluid flux measurement system may include a processor and a computer usable medium having computer program code embodied therein. The computer program code may include computer readable program code enabling the processor to determine a mean fluid flux direction at least partially form data obtained from the heated-element fluid flow sensor and computer readable program code enabling the processor to generate an output signal capable of reorienting the heated-element fluid flow sensor to face into the mean fluid flux direction.

In an arrangement, the fluid flux measurement system may further include a second fluid flux sensor disposed proximate to a measurement location of the heated-element fluid flow sensor. The second fluid flux sensor may be fixedly interconnected to the stationary portion of the motor. The second fluid flux sensor may have an angle of attack greater than an angle of attack of the heated-element fluid flow sensor. Calibration drift of the second fluid flux sensor may be less than the calibration drift of the heated-element fluid flow sensor.

In another aspect, a method of measuring fluid flux is provided that includes measuring fluid flux with a heated-element fluid flow sensor at a location, then determining a mean flux direction at the location, and adjusting a position of the heated-element fluid flow sensor based on the determined mean flux direction. The method may include measuring fluid flux at the location with a second fluid flux sensor simultaneously with the measuring of fluid flux with the heated-element fluid flow sensor. The method may further include calibrating the heated-element fluid flow sensor based on measurements made with the second fluid flux sensor. The adjusting may be performed automatically in response to the determined mean flux direction.

Further areas of applicability of the present invention will become apparent from the detailed description provided hereinafter. The various features, arrangements and embodiments discussed above in relation to each aforementioned aspect may be utilized by any of the aforementioned aspects. It should be understood that the detailed description and specific examples, while indicating the preferred embodiment of the invention, are intended for purposes of illustration only and are not intended to limit the scope of the invention.

BRIEF DESCRIPTION OF THE DRAWINGS

For a more complete understanding of the present invention and further advantages thereof, reference is now made to the following Detailed Description taken in conjunction with the accompanying drawings.

DETAILED DESCRIPTION OF THE INVENTION

In the following description, an embodiment of the invention is set forth in detail in the context of an atmospheric measurement system. Indeed, the invention has a number of benefits and provides useful results in this regard. However, it will be appreciated that various aspects of the present invention are not limited to such atmospheric-based applications. Accordingly, the following description should be understood as exemplifying the invention and not by way of limitation.

Figure 1:
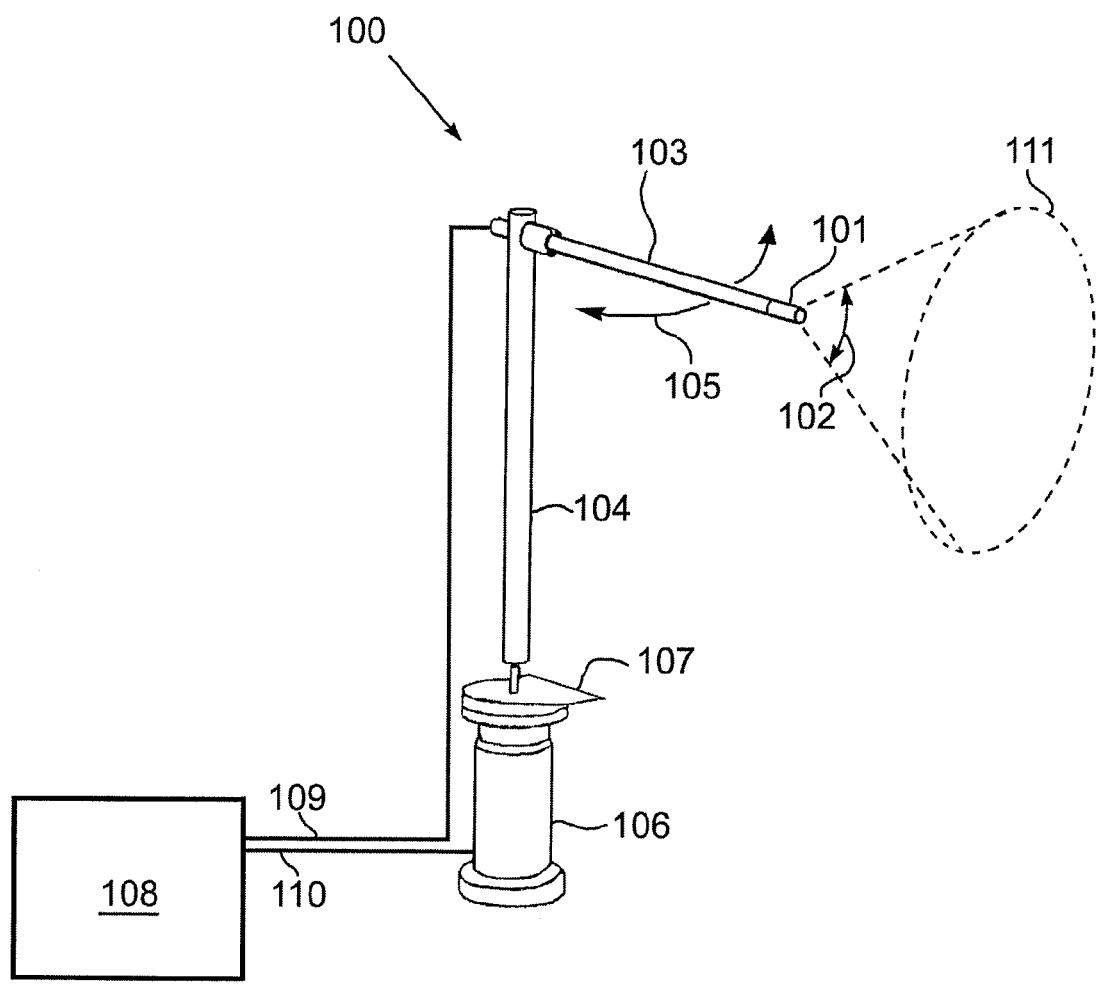
FIG. 1 is an illustration of an embodiment of the present invention that includes a heated element fluid flow sensor mounted to an output of a motor.

FIG. 1 is an illustration of a fluid flux measurement system 100 that includes a three-dimensional hot-film constant temperature anemometer (3D hot-film CTA) 101 mounted to an output member 104 of a motor 106. The 3D hot-film CTA 101 may include a plurality of fine heated elements that are heated to a temperature above ambient. The fluid flowing past the heated elements has a cooling effect on the heated elements. The heated elements may be made of metal and the resistance of the metal may be dependent upon its temperature. Therefore, the resistive properties of the 3D hot-film CTA 101 may be correlated to flow velocity of the fluid.

Control electronics 108 may be operable to maintain the heated elements of the 3D hot-film CTA 101 at a specific temperature (e.g., maintaining current flow through the heated element such that the resistance, and therefore the temperature, of the heated element remains constant). The amount of current needed to maintain the temperature can then be correlated to the fluid flux at the 3D hot-film CTA 101. Three heated elements may be present, arranged at angles to each other, to determine three dimensional fluid flux at the 3D hot-film CTA 101.

Although described with respect to the 3D hot-film CTA 101, other embodiments of the fluid flux measurement system 100 may utilize other types of heated element fluid flow sensors (an example of which is the 3D hot-film CTA 101). For example, the heated element fluid flow sensor may contain three heated elements, as in the 3D hot-film CTA 101, or the heated element fluid flow sensor may contain more or fewer elements. For another example, the heated element fluid flow sensor may operate using a constant current or constant voltage to determine fluid flux. In yet another example, the heated element fluid flow sensor may use hot-films or hot-wires as the heated elements. It will be appreciated that other appropriate heated element fluid flow sensors, such as those described above, may, where appropriate, be substituted for the 3D hot-film CTA 101 in the various embodiments described herein.

The 3D hot-film CTA 101 may be directionally limited in its ability to measure turbulence. For example, the 3D hot-film CTA 101 may have an acceptance cone 111 where, as long as the mean wind direction is within the acceptance cone 111, satisfactory turbulence measurements can be achieved with the 3D hot-film CTA 101. The width of the acceptance cone 111 may be described in terms of an angle of attack 102. In a particular implementation of the fluid flux measurement system, the 3D hot-film CTA 101 used was a 3D hot-film anemometer model number 55R91 obtained form by Dantec Dynamics, Inc., Ramsey, N.J. The 55R91 model has an angle of attack of 70.4 degrees.

The 3D hot-film CTA 101 of FIG. 1 is mounted to a mounting member 103. The mounting member 103 allows the 3D hot-film CTA 101 to be disposed remotely from the output member 104 and the motor 106. This is beneficial in that it reduces the effects on the flow of fluid at the 3D hot-film CTA 101 caused by the output member 104 and the motor 106, thus leading to more accurate measurements. The mounting member 103 may be made form any appropriate material and cross sectional shape, and may include a channel or hollow center through which wiring may be run.

Mounting member 103 may be interconnected to output member 104 which may be interconnected to the rotational output of the motor 106. In this regard, the rotational output of the motor 106 may pivot the 3D hot-film CTA 101 in a pivot direction 105. The motor 106 may be a stepper motor or any other appropriate motor operable to control the directional orientation of the 3D hot-film CTA 101. Other appropriate means of rotating the 3D hot-film CTA 101 through a predetermined arc may be used to position the 3D hot-film CTA 101. The motor may be interconnected to, and controlled by, the control electronics 108 via wiring 110.

As illustrated in FIG. 1, the 3D hot-film CTA 101 may be interconnected to the control electronics 108 by wiring 109. Other methods of interconnecting the control electronics 108 to the 3D hot-film CTA 101 may be utilized. For example, a slip ring may be used such that the amount of pivoting of the 3D hot-film CTA 101 relative to the motor 106 may be unlimited. For another example, a wireless interconnection between the 3D hot-film CTA 101 and the control electronics 108 may be used.

The motor 106 may be mounted to various members or structures via a mount 107. For example, the mount 107 may enable the motor 106 to be mounted to a tripod that may be repositionable and portable. In another example, the mount 107 may enable the motor 106 to be mounted to a permanent structure for longer-term measurements. Other appropriate methods of mounting the motor 106 may be utilized.

The control electronics 108 may include a personal computer that includes a processor and storage media. The control electronics 108 may be operable to receive and record signals from the 3D hot-film CTA 101 that may be correlated to various parameters of flow present at the 3D hot-film CTA 101. The parameters may include measurements of fluid speed and turbulence at the 3D hot-film CTA 101. The control electronics 108 may also include storage media that contains computer readable programming code that enables the processor to determine a mean fluid flux direction at least partially from data obtained from the 3D hot-film CTA 101. The control electronics 108 may also include computer readable programming code that enables the processor to generate an output signal capable of causing the motor 106 to reorient the 3D hot-film CTA 101 to face into the mean fluid flux direction.

Another fluid flux sensor or sensors may also be utilized by the fluid flux measurement system 100. For example, a second fluid flux sensor (not shown in FIG. 1) may be disposed proximate to the 3D hot-film CTA 101. This second fluid flux sensor may be used to determine a mean wind direction. This second fluid flux sensor may have a larger angle of attack then the 3D hot-film CTA 101. Furthermore, the second fluid flux sensor may have a lower calibration drift than that of the 3D hot-film CTA 101. The second fluid flux sensor may be used to determine a mean fluid flux direction present in the region of the 3D hot-film CTA 101. Using the measurements from the second fluid flux sensor, the control electronics 108 may then use the motor 106 to maintain the orientation of the 3D hot-film CTA 101 such that is facing into the mean fluid flux direction.

The fluid flux measurement system 100 may be oriented such that the plane of the pivot direction 105 is substantially parallel to a prominent local plane. For example in an outdoor application where the fluid flux measurement system 100 is being used to measure atmospheric flux, the fluid low measurement system 100 may be oriented such that the plane of the pivot direction 105 is substantially parallel to the ground proximate to where the measurement is taken. Accordingly on flat ground, the fluid flux measurement system 100 may be in an upright position as illustrated in FIG. 1. On sloped ground, the fluid flux measurement system 100 may be tilted from vertical such that the output member 104 is perpendicular to the slope and the pivot direction 105 is substantially parallel to the slope. The fluid flux measurement system 100 may include a separate temperature sensor (not shown in FIG. 1) to measure the local temperature.

Figure 2:
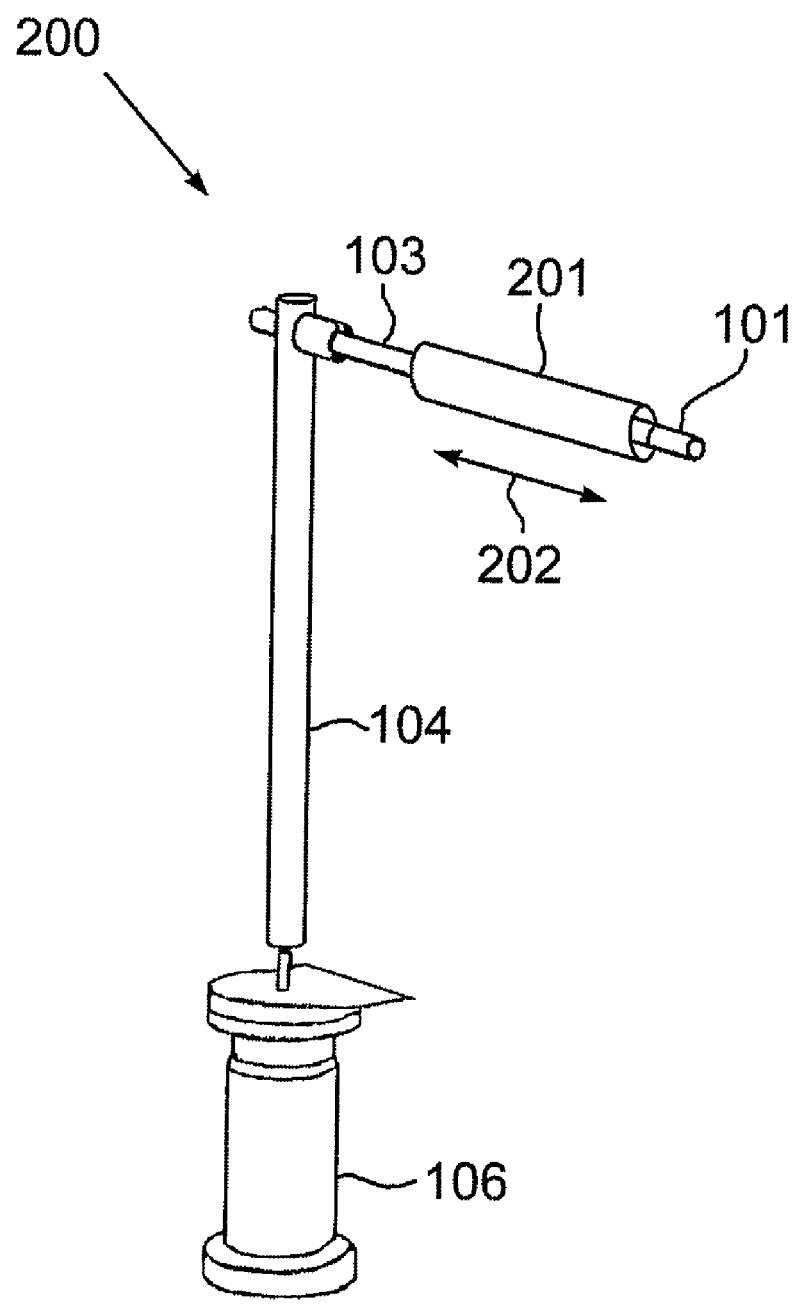
FIG. 2 is an illustration of an embodiment of the present invention that includes a heated element fluid flow sensor mounted to an output of a motor and a movable protective sleeve.

FIG. 2 illustrates a fluid flux measurement system 200 similar to the fluid flux measurement system 100 of FIG. 1. In FIG. 2, components similar to those of FIG. 1 are similarly labeled. The fluid flux measurement system 200 includes a movable protective member 201. The movable protective member 201 is illustrated in FIG. 2 in a partially retracted position. The movable protective member 201 may take the form of a sleeve that is operable to surround the 3D hot-film CTA 101. The movable protective member 201 may take any other appropriate form operable to protect the 3D hot-film CTA 101 from adverse conditions. The movable protective member 201 may be operable to move along the axis of the mounting member 103, as indicated by directional arrow 202, from a position distal from the 3D hot-film CTA 101 to a position where the movable protective member 201 is operable to protect the 3D hot-film CTA 101 from adverse conditions. Under normal operating conditions, the movable protective member 201 may be positioned in the distal location where interference with the measurement of the fluid present at the 3D hot-film CTA 101 may be insignificant. However during operating conditions that may damage the 3D hot-film CTA 101, such as high fluid flux conditions (e.g., high wind conditions), the movable protective member 201 may be moved to a position where, for example, the movable protective member 201 envelops and covers the 3D hot-film CTA 101 and thereby protects the 3D hot-film CTA 101 from damage from the high fluid flux. The movable protective member 201 may also be utilized to protect the 3D hot-film CTA 101 from other potentially damaging conditions, such as, for example in outdoor atmospheric implementations, rain or hail. The movable protective member 201 may be operable to move automatically under control of the control electronics 108. The movement of the movable protective member 201 may be determined by measurements made by the 3D hot-film CTA 101 and/or any other sensors present. A motor, linear actuator, or any other appropriate actuator (not shown in FIG. 2) may be used to move the movable protective member 201 from the distal position to the protective position.

Figure 7:
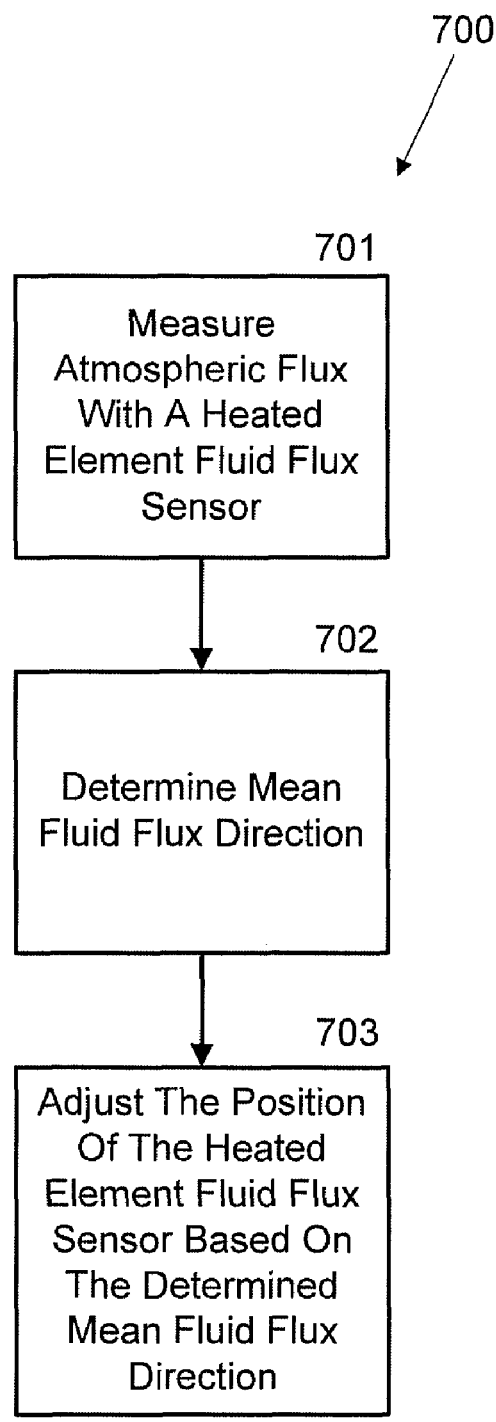
FIG. 7 is a flow diagram of an embodiment of a method of adjusting the position of a heated element fluid flow sensor.

FIG. 7 illustrates a set of steps 700 describing a method of measuring fluid flux. The method may use the fluid flux measurement system 100 described with reference to FIG. 1. The first step 701 of the method may be to measure atmospheric flux with a heated element fluid flux sensor. The heated element fluid flux sensor may be a sensor such as the 3D hot-film CTA 101. Although described herein in terms of the measurement of atmospheric flux, the flux of other fluids may be measured using the instant method. Simultaneously with the performance of the first step 701, the fluid flux may be measured with an optional second fluid flux sensor. The measurements performed by the second fluid flux sensor may be used to calibrate the heated element fluid flux sensor. This process is described below with reference to FIG. 3.

The next step 702 may be to determine the mean fluid flux direction 702. This may be determined directly from readings made with the heated element fluid flux sensor or this may be determined by the optional second fluid flux sensor, or a combination of the second fluid flux sensor and the heated element fluid flux sensor.

The third step 703 may be to adjust the position of the heated element fluid flux sensor based on the determined mean fluid flux direction. Step 703 may be performed automatically in response to the determined mean fluid flux direction of 702. The method may further include moving a movable protective member over the heated element fluid flux sensor in response to a first set of conditions and automatically retracting the movable protective member from over the heated element fluid flux sensor in response to a second set of conditions. For example, if an event (e.g., high winds) potentially hazardous to the heated element fluid flux sensor is detected, the movable protective member may be moved over the heated element fluid flux sensor in order to protect the heated element fluid flux sensor from the potentially damaging event. After the event has passed, the movable protection member may be reposition such that it does not interfere with measurements made by the heated element fluid flux sensor.

Figure 3:
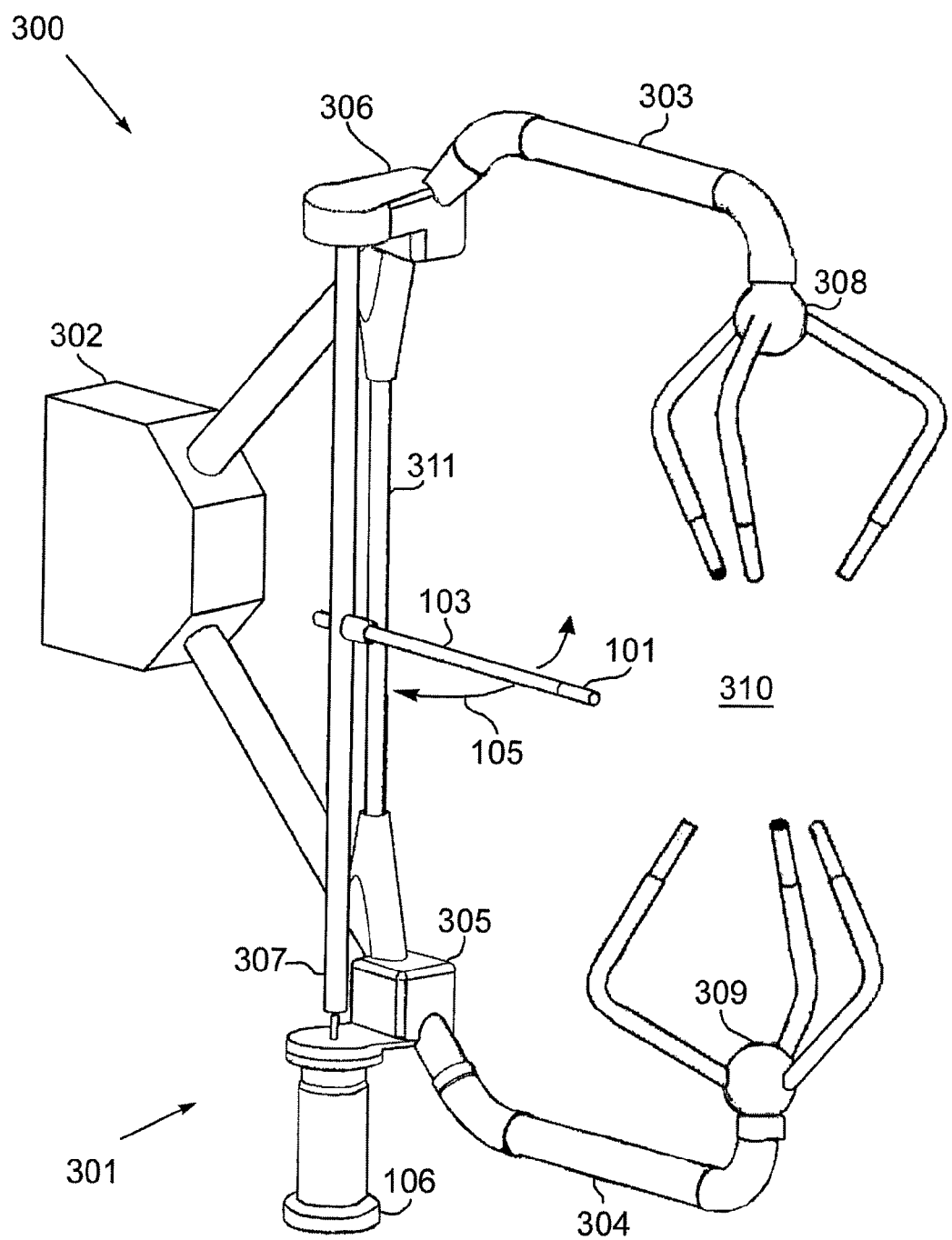
FIG. 3 is an illustration of an embodiment of the present invention that includes a motor mounted to a sonic anemometer and a heated element fluid flow sensor mounted to the output of the motor.

FIG. 3 is an illustration of an embodiment of an atmospheric measurement system 300. In FIG. 3, components similar to those of FIG. 1 are similarly labeled. The atmospheric measurement system 300 includes a fluid flux measurement system 301 similar to the fluid flux measurement system 100 of FIG. 1. The fluid flux measurement system 301 includes a 3D hot-film CTA 101 interconnected to the mounting member 103 that can be pivoted about an output member 307 by a motor 106. In the atmospheric measurement system 300, the motor 106 is fixedly mounted to a sonic anemometer 302. As illustrated in FIG. 3, the rotational output of the motor 106 is interconnected to the output member 307. The motor 106 is mounted via a lower mount 305 to a lower arm 304 of the sonic anemometer 302. The end of the output member 307 opposite from the motor 106 is rotationally connected to an upper mount 306 which is fixedly attached to an upper arm 303 of the sonic anemometer 302. The upper mount 306 may contain a bearing or other device to allow the output member 307 to rotate relative to the upper mount 306 about a longitudinal axis of the output member 307.

The sonic anemometer 302, as noted, includes the upper arm 303 and the lower arm 304. An upper anemometer head 308 and a lower anemometer head 309 are attached to the upper arm 303 and lower arm 304, respectively. As known to those skilled in the art, the sonic anemometer 302 uses ultrasonic transducers within the upper anemometer head 308 and lower anemometer head 309 to measure atmospheric flow within and anemometer measurement region 310 located between the two heads.

The sonic anemometer 302 may be capable of measuring atmospheric flow in three dimensions within the anemometer measurement region 310. The sonic anemometer 302 may also be capable of measuring the temperature of the atmosphere within the anemometer measurement region 310. In a particular implementation, the sonic anemometer 302 may be a model CSAT3 sonic anemometer made by Campbell Scientific, Inc. of Logan, Utah. The sonic anemometer 302 may have a 360 degree angle of attack, although it may be beneficial to align the sonic anemometer 300 to such that the anemometer heads 308, 309 face into the prevailing wind direction. Generally, the sonic anemometer 302 will be fixedly mounted and its orientation (e.g., relative to true North) will be known.

The 3D hot-film CTA 101 may be disposed relative to the anemometer measurement region 310 such that it the 3D hot-film CTA 101 is operable to measure atmospheric conditions in substantially the same region as the sonic anemometer 302. Furthermore, the 3D hot-film CTA 101 may be pivotable about an axis parallel to an axis connecting the two anemometer heads 308, 309. In this regard, as the 3D hot-film CTA 101 is pivoted, it will remain within a plane that intersects the anemometer measurement region 310. To avoid excessive effects on the measurements made by the sonic anemometer 302 due to the presence of the 3D hot-film CTA 101, the 3D hot-film CTA 101 may be positioned away from the centroid of the anemometer heads 308, 309. For example, in an implementation, the mounting member 103 is a rod with a diameter of 6 mm. In a particular implementation, to ensure that the 3D hot-film CTA 101 and the mounting member 103 did not significantly interfere with the measurements made by the sonic anemometer 302, the mounting member 103 was treated as a vertical cylinder and located more than 20 radii of that cylinder from the centroid of the sonic the anemometer heads 308, 309.

As shown in FIG. 3, the motion of the 3D hot-film CTA 101 may be limited due to contact with a vertical support 311 of the sonic anemometer 302. In implementation, the full rotational range of the configuration illustrated in FIG. 3 was 235 degrees. The zero position of the motor 106 was said to be parallel to the sonic anemometer upper and lower arms 303, 304, and thus the system had 95 degrees of clockwise range and 140 degrees of counterclockwise range from the zero position. However, the fluid flux measurement system 301 is capable of being mounted upside down (relative to as shown in FIG. 3) to allow for alternative rotational ranges. Additionally, the fluid flux measurement system 301 may incorporate a movable protective member such as that described with reference to the fluid flux measurement system 200 of FIG. 2.

The combination of the sonic anemometer 302 and the fluid flux measurement system 301 that is pivotable relative to the sonic anemometer 302 possesses several symbiotic benefits. In general, the 3D hot-film CTA 101 may have a higher frequency response and may be operable to measure significantly smaller structures within the turbulent flow as compared to a sonic anemometer 302. For example, the sampling rate of the sonic anemometer 302 may be in the 100 Hz range while that of the 3D hot-film CTA 101 may be about 100 KHz.

The sonic anemometer 302 averages velocities measured between the anemometer heads 308, 309, which is typically a distance of about 10 cm. As such, the sonic anemometer 302 may not be operable to measure smaller critical structures in the turbulent flow whereas the 3D hot-film CTA 101 may have a sensing element of about 1 mm long and be operable to measure turbulent fluctuations in the Taylor microscale.

However, the 3D hot-film CTA 101 is a relative sensor that may require relatively frequent calibration that previously contributed to it being unsuitable for field measurements (e.g., measurements outside of a laboratory environment). On the other hand, the sonic anemometer 302 is a relatively robust measurement instrument that is an absolute sensor that can operate at remote locations for significant durations of a time without the need for calibration. Accordingly, a symbiotic benefit of the atmospheric measurement system 300 of FIG. 3, may be that the sonic anemometer 302 can be used to perform in-situ calibration of the 3D hot-film CTA 101.

Furthermore, as discussed above, the 3D hot-film CTA 101 may have a limited angle of attack which previously made it unsuitable for long-term use in remote locations since, inter alia, mean wind direction may shift such that it has moved out of the 3D hot-film CTA's 101 angle of attack. By gathering mean wind direction data and mounting the 3D hot-film CTA 101 on a pivotable mounting member 103, the 3D hot-film CTA 101 can be repositioned in-situ such that the mean wind direction is consistently within its angle of attack. This ability is enhanced by the ability of the sonic anemometer 302 to measure mean wind direction anywhere within its 360-degree angle of attack. Therefore, even in cases of sudden wind shifts that would normally be outside of the angle of attack of the 3D hot-film CTA 101, mean wind direction information gathered from the sonic anemometer 302 can be used to reposition to the 3D hot-film CTA 101.

In addition, in embodiments that include a movable protective member 201, while the movable protective member 201 is protecting the 3D hot-film CTA 101, the sonic anemometer 302 can be used to detect when local conditions change such that it is no longer unsafe to expose the 3D hot-film CTA 101. At such a time, the movable protective member 201 may be retracted and the 3D hot-film CTA 101 may again be used to measure atmospheric properties.

Figure 4:
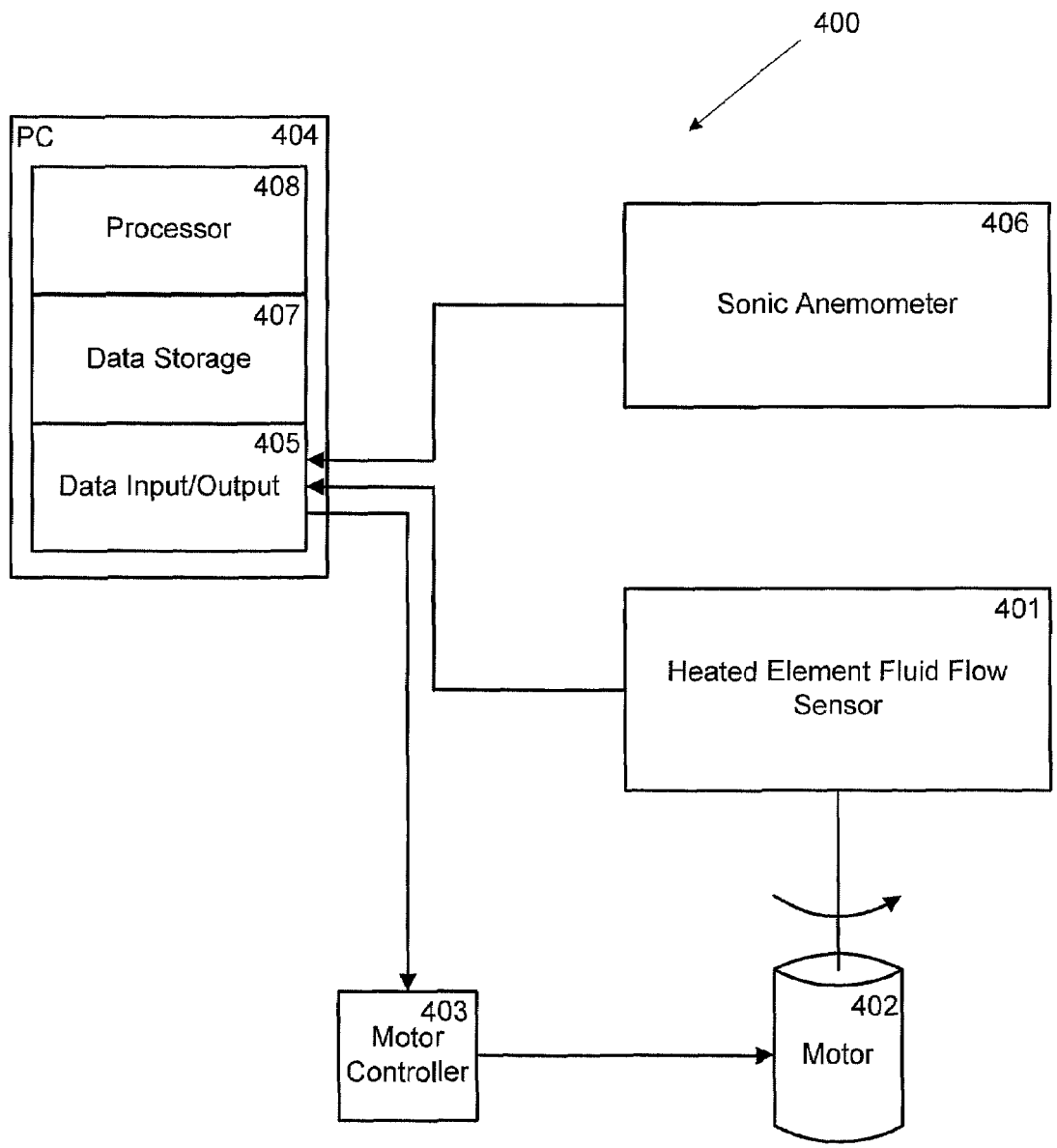
FIG. 4 is a schematic diagram of an embodiment of a two sensor system with one movable sensor axis under computer control.

FIG. 4 is a schematic diagram of an embodiment of a two sensor atmospheric measurement system 400 with one movable sensor axis under computer control. The atmospheric measurement system 400 includes a sonic anemometer 406 that is electrically interconnected to a data input/output unit 405 within a personal computer (PC) 404. In this regard, atmospheric measurements made by the sonic anemometer 406 are inputted into the PC 404. The atmospheric measurement system 400 also includes a heated element fluid flow sensor 401 that is electrically interconnected to the data input/output unit 405. Thusly, atmospheric measurements made by the heated element fluid flow sensor 401 are also inputted into the PC 404. The heated element fluid flow sensor 401, which may be a 3-D hot-film CTA, is mechanically mounted to the output of a motor 402. The motor 402 may be electrically interconnected and controlled by a motor controller 403 which may in turn be interconnected to the PC 404 via the data input/output unit 405. The PC 404 may include a data storage unit 407 which may store data such as measurements made by the sonic anemometer 406 and the heated element fluid flow sensor 401, and programs used by a processor 408 to control the various components of the atmospheric measurement system 400.

Figure 6:
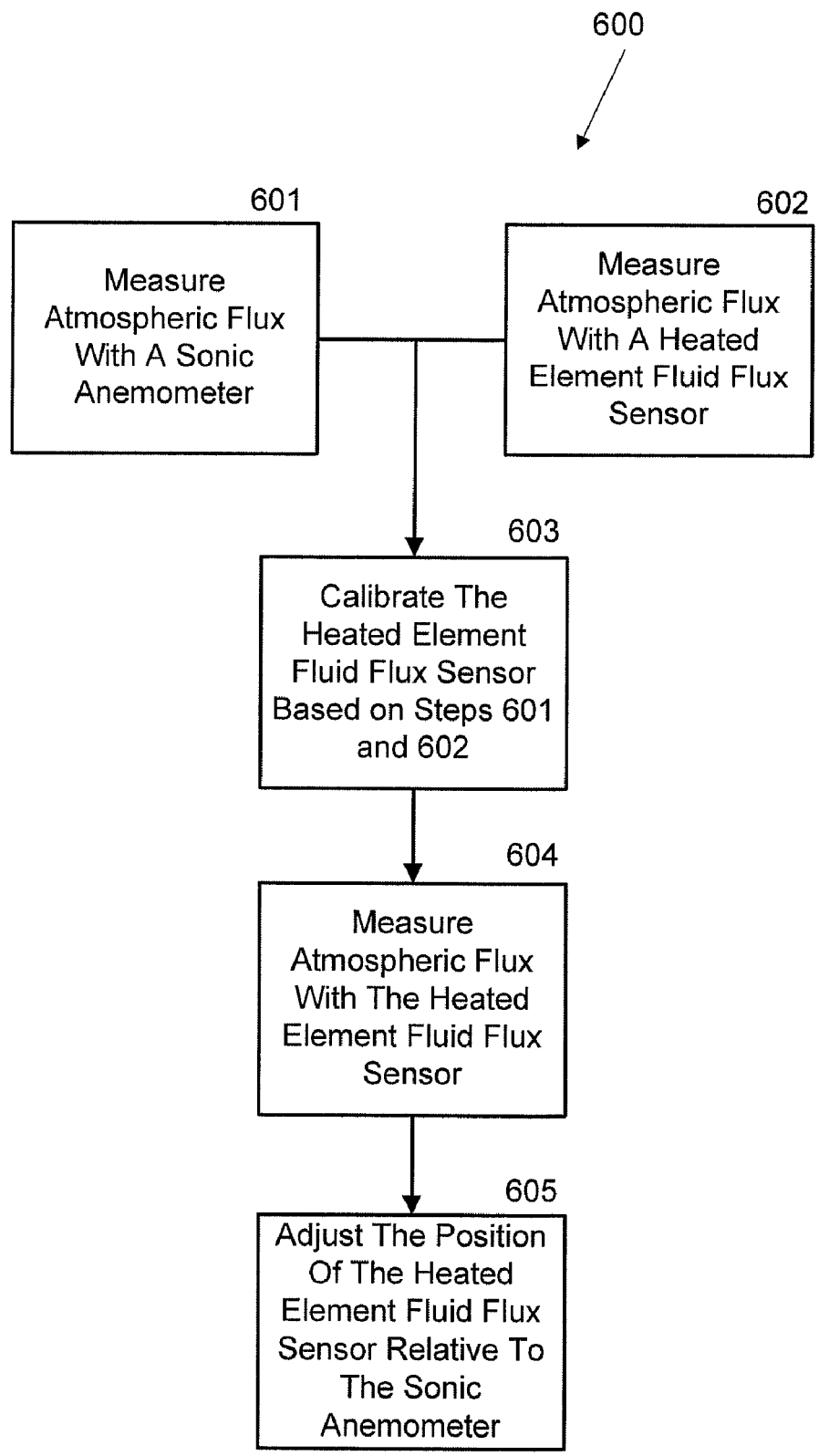
FIG. 6 is a flow diagram of an embodiment of a method of measuring atmospheric flux.

FIG. 6 illustrates a set of steps 600 describing a method of measuring atmospheric flux. The method may use the atmospheric measurement system 300 described with reference to FIG. 3. The first step 601 of the method may be to measure atmospheric flux with a sonic anemometer. Simultaneously with the performance of the first step 601, the next step 602 of measuring atmospheric flux with a heated element fluid flux sensor may be performed. The heated element fluid flux sensor may be a 3D hot-film CTA. During step 602, the heated element fluid flux sensor may record atmospheric flux in such a way as to enable the measurements from the first step 601 to be used to calibrate the heated element fluid flux sensor. Indeed, the next step 603 may be to calibrate the heated element fluid flux sensor based on the atmospheric flux measurements from steps 601 and 602. Once calibrated, the next step 604 may be to measure atmospheric flux with the heated element fluid flux sensor. The measurements made in step 604 may be at a sampling rate that takes full advantage of the fast frequency response of the heated element fluid flux sensor. For example, the heated element fluid flux sensor may be operated with a sampling rate of 2,000 Hz or more.

The next step 605, may be to adjust the position of the heated element fluid flux sensor relative to the sonic anemometer. This step may be performed automatically and may be based on a measured mean wind direction. For example, the position of the heated element fluid flux sensor may be controlled by software. The software may control a motor to which the heated element fluid flux sensor is mounted. The software may send positioning signals to the motor at a user specified interval. Those signals may be generated from an averaging process that reports a mean wind direction.

To avoid excessive and/or unnecessary movement of the heated element fluid flux sensor, the heated element fluid flux sensor may only be repositioned if the mean wind direction has changed by an amount that is over a predeterminable user specified angle. For example, a user may specify an angle from 15 to 20 degrees such that the heated element fluid flux sensor is only repositioned if the mean wind direction is determined to be more than the 15 to 20 degrees from the center of the angle of attack of the heated element fluid flux sensor. Limiting the movement of the heated element fluid flux sensor may be beneficial since data acquired from the heated element fluid flux sensor while it is in motion may be unusable or may require further processing to reduce the effect of the movement on the measurements.

Figure 5:
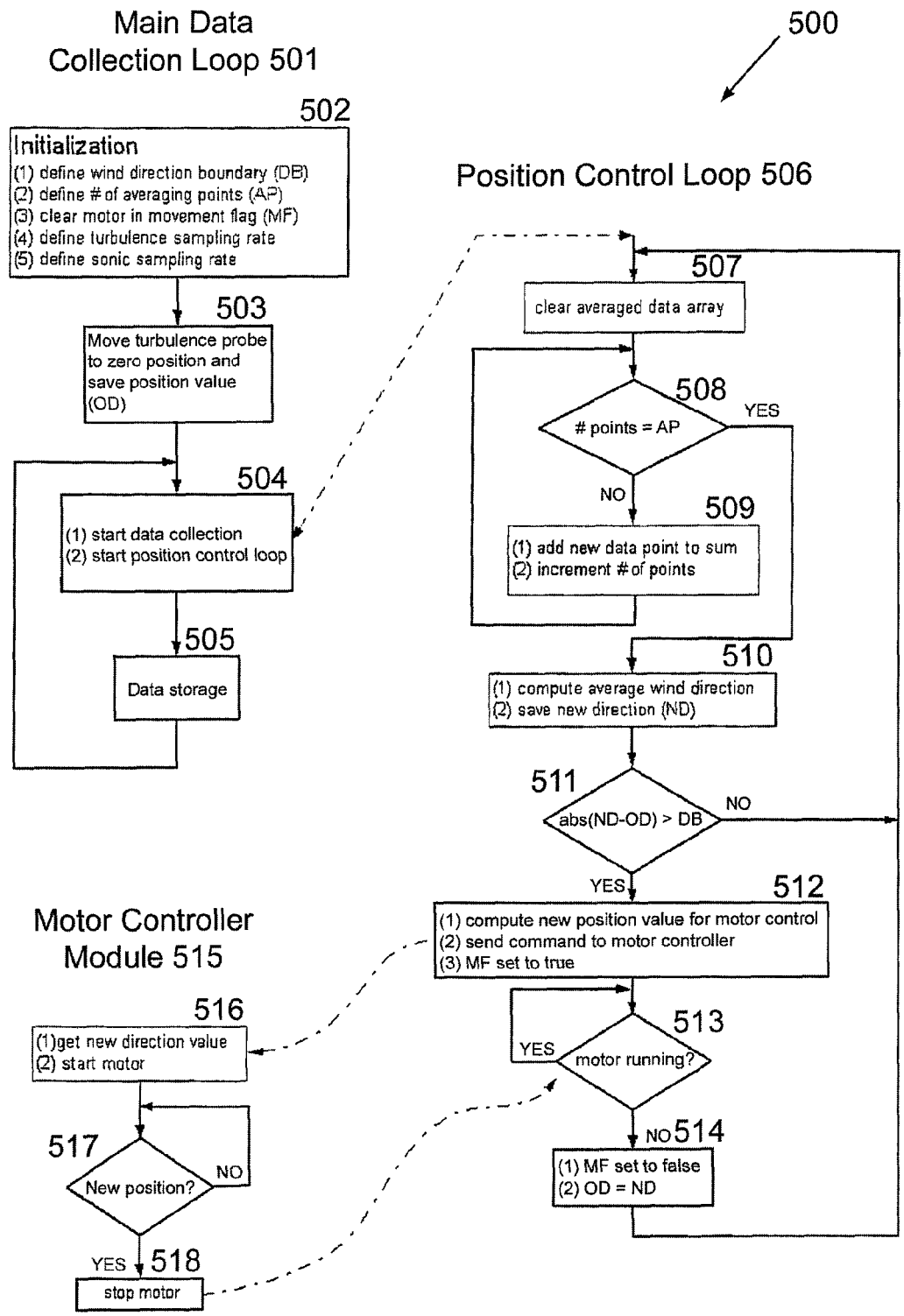
FIG. 5 is a flow diagram illustrating an embodiment of software operable to control a motor.

FIG. 5 is a flow diagram illustrating an embodiment of software operable to control an atmospheric measurement system. The flow diagram 500 refers to the heated element fluid flux sensor as the turbulence probe. The flow diagram 500 contains three sections: a main data collection loop 501, a position control loop 506, and a motor controller module 515. The first step 502 in the main data collection loop 501 is the initialization of the software. In the initialization step, various parameters may be defined. For example, a wind direction boundary (DB) may be defined where the DB represents the maximum allowable amount of angular offset between a currently measured wind direction and the direction in which the heated element fluid flux sensor is pointing. Other parameters such as the number of averaging points to be used to determine a wind direction and sampling rates for the various sensors may also be determined. During initialization, various parameters or flags may be cleared. For example, a motor movement flag (MF) may be cleared.

After initialization, the next step 503 may be to move the turbulence probe to a zero position. This may be followed by a data collection step 504. The position control loop 506 may be started during the data collection step 504. The collected data from step 504 may be stored in step 505. Data collection and storage may be repeated as appropriate. For example, data collection and storage may continue for a pre-determinable amount of time.

The position control loop 506 is the portion of the software that controls the position of the turbulence probe relative to time the wind direction. The first step 507 of the position control loop 506 may be to clear an array used to store averaged data. The next steps 508 and a 509 may accumulate data points (e.g., measurements of instantaneous wind direction) until the number of accumulated data points equals a predetermined level. Once the predetermined level is met, the next step 510 may be to compute an average wind direction from the accumulated data points. The calculated value may be saved as the new wind direction and in the next step 511 the new wind direction may be compared to the current direction in which the turbulence probe is pointed. If the difference between the new wind direction and the direction in which the turbulence probe is pointed does not exceed the wind direction boundary (DB), the position control loop 506 may return to step 507 and calculate another average wind direction.

If the difference between the new wind direction and the direction in which the turbulence probe is pointed exceeds the wind direction boundary (DB), the position control loop may continue to step 512 to begin the turbulence probe repositioning process. Step 512 may include computing a desired new position for the turbulence probe and sending that new position to the motor controller module 515. The position control loop 506 may then pause in step 513 while the motor is actively running to reposition the turbulence probe. After the motor stops running and the turbulence probe is repositioned, the new position of the turbulence probe may be set in step 514, and the position control loop 506 may return to step 507.

The motor controller module 515 may, in step 516 receive the position to be attained and start the motor. In step 517, the motor controller module 515 may monitor the position of the motor to determine if it has reached the desired new position. Once the desired new position is attained, the motor control module 515 may stop the motor in step 518. While the motor is in motion, the system may temporarily stop taking measurements with the turbulence probe or the measurements made with the turbulence probe may be flagged as taken while the turbulence probe was in motion.

Other turbulence probe control schemes may be utilized where appropriate. For example, instead of measuring mean wind direction over a discrete number of measured points, the mean wind direction may be measured in a sliding window (e.g., the mean wind direction may be calculated using the a predetermined number of the most recent accumulated data points).

While various embodiments of the present invention have been described in detail, it is apparent that further modifications and adaptations of the invention will occur to those skilled in the art. For example, the methods and systems for measuring fluid flux are generally described herein with respect to the atmosphere. However, the systems and methods could be used with other fluid fluxes. However, it is to be expressly understood that such modifications and adaptations are within the spirit and scope of the present invention.

What is claimed:

1. An atmospheric measurement system comprising:
    a sonic anemometer;
    a heated element anemometer;
    a mount for mounting said heated element anemometer relative to said sonic anemometer, wherein a position of said heated element anemometer relative to said sonic anemometer is adjustable; and
    a processor and a computer usable medium having computer program code embodied therein, the computer program code including:
        computer readable program code enabling said processor to determine a mean wind direction at least partially from data obtained from at least one of said sonic anemometer and said heated element anemometer; and
        computer readable program code enabling said processor to generate an output signal capable of reorienting said heated element anemometer to face into said mean wind direction.

2. The atmospheric measurement system of claim 1, wherein said heated element anemometer is a constant temperature anemometer, wherein said constant temperature anemometer is at least a hot-wire anemometer or a hot-film anemometer.

3. The atmospheric measurement system of claim 1, wherein said heated element anemometer is disposed proximate to a measurement path of said sonic anemometer, wherein said heated element anemometer is positioned relative to said sonic anemometer such that said heated element anemometer and said sonic anemometer are operable to measure substantially the same fluid movement.

4. The atmospheric measurement system of claim 1, further comprising an electric motor, wherein a stationary portion of said electric motor is fixedly interconnected to said sonic anemometer and a rotational output of said electric motor is interconnected to said heated element anemometer.

5. The atmospheric measurement system of claim 4, wherein said sonic anemometer defines a first axis between two transducer mounting points, wherein said heated element anemometer is pivotable through an arc contained within a plane perpendicular to said first axis.

6. The atmospheric measurement system of claim 1, wherein said atmospheric measurement system is operable to adjust said position of said heated element anemometer relative to said sonic anemometer automatically in response to a measurement by said atmospheric measurement system.

7. An atmospheric measurement system comprising:
    a sonic anemometer;
    a heated element anemometer;
    a mount for mounting said heated element anemometer relative to said sonic anemometer, wherein a position of said heated element anemometer relative to said sonic anemometer is adjustable; and
    a movable protective member for protecting said heated element anemometer, wherein said movable protective member is repositionable between a first position and a second position, wherein in said first position said movable protective member does not interfere with the measurement capability of said heated element anemometer, wherein in said second position said movable protective member is operable to protect said heated element anemometer from local weather conditions.

8. The atmospheric measurement system of claim 7, wherein said movable protective member is operable to be automatically moved between said first position and said second position based at least in part on measurements made by at least one of said sonic anemometer and said heated element anemometer.

9. A method of measuring atmospheric flux, said method comprising:
    a. measuring atmospheric flux with a sonic anemometer;
    b. measuring atmospheric flux with a heated element anemometer contemporaneously with step a, wherein said heated element anemometer is disposed proximate to said sonic anemometer;
    c. calibrating said heated element anemometer based on steps a and b;
    d. measuring atmospheric flux with said heated element anemometer after step c; and
    e. adjusting a position of said heated element anemometer relative to said sonic anemometer after step d, wherein said adjusting a position of said heated element anemometer relative to said sonic anemometer is performed using a motor.

10. The method of claim 9, wherein said heated element anemometer is at least one of a hot-wire anemometer and a hot-film anemometer.

11. The method of claim 9, wherein said adjusting a position of said heated element anemometer relative to said sonic anemometer is performed automatically in response to a change in mean wind direction proximate to said heated element anemometer.

12. The method of claim 11, wherein said change in mean wind direction is measured by at least one of said sonic anemometer and said heated element anemometer.

13. The method of claim 9, further comprising:
    positioning a protective sleeve over said heated element anemometer in response to a first set of predetermined atmospheric conditions;
    retracting said protective sleeve from over said heated element anemometer in response to a second set of predetermined atmospheric conditions, wherein said first set of predetermined atmospheric conditions includes a predetermined wind velocity.

14. A method of measuring atmospheric flux, said method comprising:
    a. measuring atmospheric flux with a sonic anemometer;
    b. measuring atmospheric flux with a heated element anemometer contemporaneously with step a, wherein said heated element anemometer is disposed proximate to said sonic anemometer;
    c. calibrating said heated element anemometer based on steps a and b;
    d. measuring atmospheric flux with said heated element anemometer after step c; and
    e. adjusting a position of said heated element anemometer relative to said sonic anemometer after step d,
    wherein said adjusting is performed automatically in response to a change in mean wind direction proximate to said heated element anemometer, and wherein said adjusting is a pivotal movement of said heated element anemometer relative to said sonic anemometer.

15. The method of claim 14, wherein said pivotal movement aligns an angle of attack of said heated element anemometer with said mean wind direction.

16. An atmospheric measurement system comprising:
    a sonic anemometer;
    a heated element anemometer;
    a mount for mounting said heated element anemometer relative to said sonic anemometer, wherein a position of said heated element anemometer relative to said sonic anemometer is adjustable; and a motor interconnected to said sonic anemometer and said heated element anemometer, wherein said motor produces relative movement between said sonic anemometer and said heated element anemometer.

17. The atmospheric measurement system of claim 16, wherein said motor is an electric motor.

* * * * *

UNITED STATES PATENT AND TRADEMARK OFFICE
CERTIFICATE OF CORRECTION

| | | |
|---|---|---|
| PATENT NO. | : 7,949,481 B2 | Page 1 of 1 |
| APPLICATION NO. | : 12/124469 | |
| DATED | : May 24, 2011 | |
| INVENTOR(S) | : Poulos et al. | |

It is certified that error appears in the above-identified patent and that said Letters Patent is hereby corrected as shown below:

Column 6, line 40, delete "form" and insert therefor --from--.
Column 7, line 38, delete "low" and insert therefor --flux--.
Column 12, line 58, delete the second occurrence of "the".

Signed and Sealed this
Nineteenth Day of July, 2011

David J. Kappos
*Director of the United States Patent and Trademark Office*